United States Patent
Maaninen et al.

(10) Patent No.: US 10,744,704 B2
(45) Date of Patent: Aug. 18, 2020

(54) DIFFRACTIVE MICROSTRUCTURE AND A METHOD OF PRODUCING THE SAME

(75) Inventors: Arto Maaninen, Oulu (FI); Pia Qvintus-Leino, Vtt (FI); Soili Peltonen, Vtt (FI)

(73) Assignee: TEKNOLOGIAN TUTKIMUSKESKUS VTT OY, Espoo (FI)

(*) Notice: Subject to any disclaimer, the term of this patent is extended or adjusted under 35 U.S.C. 154(b) by 59 days.

(21) Appl. No.: 12/809,510

(22) PCT Filed: Dec. 17, 2008

(86) PCT No.: PCT/FI2008/050755
§ 371 (c)(1),
(2), (4) Date: Sep. 8, 2010

(87) PCT Pub. No.: WO2009/080879
PCT Pub. Date: Jul. 2, 2009

(65) Prior Publication Data
US 2010/0327485 A1    Dec. 30, 2010

(30) Foreign Application Priority Data

Dec. 21, 2007    (GB) .................................. 0725100.2

(51) Int. Cl.
| | | |
|---|---|---|
| B29C 59/02 | (2006.01) | |
| B28B 11/08 | (2006.01) | |
| B32B 3/30 | (2006.01) | |
| B44F 1/00 | (2006.01) | |
| B29C 59/04 | (2006.01) | |
| G02B 5/18 | (2006.01) | |
| B29D 11/00 | (2006.01) | |
| B41M 1/24 | (2006.01) | |

(52) U.S. Cl.
CPC .......... *B29C 59/026* (2013.01); *B29C 59/046* (2013.01); *B29D 11/00365* (2013.01); *G02B 5/1861* (2013.01); *B29C 2059/023* (2013.01); *B29K 2995/006* (2013.01); *B29K 2995/0018* (2013.01); *B29K 2995/0059* (2013.01); *B41M 1/24* (2013.01); *Y10T 428/2457* (2015.01)

(58) Field of Classification Search
CPC ............ G02B 5/1861; Y10T 428/2457; B29C 59/026; B29C 59/046; B29C 2059/023; B29D 11/00365; B41M 1/24; B29K 2995/0018; B29K 2995/006; B29K 2995/0059

USPC ........................................................ 428/141
See application file for complete search history.

(56) References Cited

U.S. PATENT DOCUMENTS

| 4,668,523 | A | 5/1987 | Begleiter |
|---|---|---|---|
| 5,869,647 | A * | 2/1999 | Narayan ................. C08B 31/04 536/102 |
| 6,689,316 | B1 | 2/2004 | Blyth et al. |
| 2003/0119949 | A1* | 6/2003 | Favis ....................... C08J 3/005 524/47 |
| 2003/0173046 | A1 | 9/2003 | Jaaskelainen et al. |
| 2004/0018343 | A1* | 1/2004 | Weder ........................... 428/141 |
| 2004/0067360 | A1 | 4/2004 | Steenblik et al. |
| 2004/0247829 | A1* | 12/2004 | Depres ................... D21H 19/66 428/141 |
| 2006/0068006 | A1 | 3/2006 | Begleiter |
| 2007/0116943 | A1 | 5/2007 | Sinclair et al. |
| 2007/0286811 | A1 | 12/2007 | Walter |
| 2007/0287777 | A1 | 12/2007 | Kawamura et al. |

FOREIGN PATENT DOCUMENTS

| EP | 1 072 657 A1 | 1/2001 |
|---|---|---|
| GB | 2273998 A * | 7/1994 |
| WO | WO 2010/055210 A1 | 5/2010 |

OTHER PUBLICATIONS

International Search Report, dated Apr. 23, 2009, issued in corresponding PCT/FI2008/050755.
Supplementary European Search Report, dated Aug. 21, 2017, for European Application No. 08865555.

* cited by examiner

*Primary Examiner* — Nancy R Johnson
(74) *Attorney, Agent, or Firm* — Birch, Stewart, Kolasch & Birch, LLP

(57) ABSTRACT

Diffractive microstructure comprising micro-protrusions or microgrooves or a combination thereof and method of producing the same. The microstructure is formed in a layer of a thermoplastic carbohydrate polymer or a polymer derived from a carbohydrate material, said polymer having a glass transition point of less than 210° C. The thermoplastic polymer is preferably selected from the group of native starch, dextrin, native hemicellulose, native cellulose, poly (lactic acid), polylactides, polycaprolactone, starch derivatives, dextrin derivatives, hemicellulose derivatives, cellulose derivatives, and mixtures thereof. The invention provides an inexpensive and reliable way of incorporating into the products safety markings, which allow for visual inspection or detection, such as holograms and barcodes.

8 Claims, No Drawings

DIFFRACTIVE MICROSTRUCTURE AND A METHOD OF PRODUCING THE SAME

The present invention concerns a diffractive microstructure comprising micro-protrusions or microgrooves or a combination thereof formed in a layer of a thermoplastic carbohydrate polymer or a polymer derived from a carbohydrate material, said polymer having a glass transition point of less than 210° C.

A microstructure of the present kind comprises micro-protrusions or microgrooves or a combination thereof formed in a layer of a thermoplastic polymer.

The present invention also concerns a method of producing a microstructure comprising a cinegram, an exelgram or a hologram for producing diffractive microstructures.

There is a growing interest in providing means for identification of fibrous materials and for verifying the origin thereof. An object is to prevent or at least making more difficult the production and distribution of counterfeit goods packed in such materials. As specific examples of important goods can be mentioned medicines and tobacco products packed in cardboard packages.

Examples of safety features (in the following also "safety markings") incorporated into fibrous materials include various tags and labels allowing for optical or electrical identification of the materials. In particular, there are a number of RFID and barcode tag solutions known in the art. One problem related to present day tags and labels is that they have to be attached to the surface of, e.g., the cardboard, in a separate process step. Depending on how they are fixed to the cardboard surface, for example by use of adhesives, there is always a risk that they might fall off during handling or conversion. There is also a considerable risk that separate safety markings are copied and used for counterfeiting of the product.

It is an aim of the present invention to eliminate at least a part of the problems related to the known art and to provide a technical solution for incorporating safety markings integrally into fibrous product during production so as to allow for identification of the origin of the product and for preventing manipulation of a product by attachment of a separate tag or label.

Embossing methods for forming diffractive microstructured areas on surface layers of substrates are known in the art (cf. for instance WO 2006/07053 and WO 2006/056660). According to WO 2006/051170 an optical diffraction element is formed directly on the surface of a substrate, using its surface material which, in the case of paper or cardboard, is a top layer suitable formed by a coating paste, size, resin, extrusion coating, surface lacquer or printing ink, which can be processed to create a microstructure forming the optical diffraction element, for example by embossing.

The present invention is based on the finding that it is possible to form optically identifiable microstructures on the surface of a fibrous product by hot-pressing of a specific kind of layer present on the surface of the product or which forms a part of the product, viz. a layer formed by thermoplastic carbohydrate polymer or derivatives thereof. In particular, the present invention comprises using, as a substrate for the embossing operation, a layer of a thermoplastic carbohydrate polymer or a polymer derived from a carbohydrate material, said polymer having a glass transition point of less than 210° C.

The diffractive microstructure can be produced by a method comprising the steps of forming a layer of a thermoplastic carbohydrate polymer having a glass transition point of less than 210° C.; and embossing into the layer a diffractive microstructure comprising micro-protrusions or microgrooves or a combination thereof.

More specifically, the present invention is mainly characterized by a diffractive microstructure comprising micro-protrusions or microgrooves or a combination thereof formed in a layer of a thermoplastic carbohydrate polymer or a polymer derived from a carbohydrate material, said polymer having a glass transition point of less than 210° C.

The method according to the present invention is characterized by the microstructure comprising a cinegram, an exelgram or a hologram.

Considerable advantages are obtained by the invention. Thus, the invention provides an inexpensive and reliable way of incorporating into the products safety markings, which allow for visual inspection or detection e.g. based on polychromatic light or based on the use of laser beams and other monochromatic light. Typically, the present microstructure is capable of diffracting light in the visual range, in the ultraviolet range, in the infrared range or in a broad wavelength range comprising visual, ultraviolet and/or infrared light.

The microstructures can be impressed into the surface of the materials during the production process.

The polymers used in the invention are biocompatible and, in some cases, even biodegradable materials. The biocompatibility allows for the use of the polymer layers in foodstuff packagings and wrappings of other products which must meet stringent requirements, e.g. as cigarette papers. The cost for the application of the marking is small compared to the cost of the product and its package. Further, no additional processing of the embossed surfaces is required for achieving visually complete and mechanically durable decorations.

Further features and advantages of the invention will become apparent from the following detailed description of particularly preferred embodiments.

As was discussed above, the present invention provides novel diffractive microstructure in layers formed by thermoplastic carbohydrate polymers and polymers derived from such materials. The microstructures can be used as a safety marking, as an identification marking or for decorative purposes ("rainbow colours"). They are useful also for brand promotion.

Generally speaking, the pattern typically comprises a plurality of mechanical deformations, which upon reflection of incident waves of light, in particular light having a wave length within the range of visible light, will produce a diffractive pattern. The pattern can produce varying visual effects depending on the observation angle relative to the light sources present.

A suitable pattern can be formed of engravings, i.e., pits or microgrooves, which extend from the surface of the varnish into the varnish layer. It can also be formed by rises, micro-protrusions which extend from the surface of the varnish layer away from the surrounding surface level.

The grooves or protrusions can also be of variable depth, breadth and height, respectively. Typically they have a smallest dimension in the range of light, i.e. visible only or the range from UV to visible or visible to IR or in the broad range from UV to IR. Dimensions outside the indicated ranges are also possible. Thus, generally, the smallest dimension of the grooves and ridges of the microstructures are in the range of about 10 nm to 1500 nm, in particular about 50 nm to 1000 nm, and preferably about 75 to 800 nm.

Based on the foregoing, the present diffractive microstructures can comprise cinegrams, exelgrams or holograms and other structures (barcodes), which are detectable by visual inspection. In one preferred embodiment, the diffractive pattern comprises a holographically imaged pattern (a hologram), which gives a three dimensional impression to the viewer.

The visual markings can be complemented with codes which are invisible to the naked eye but which can be read with a separate reader.

The present microstructures comprising micro-protrusions or microgrooves or a combination thereof are formed into a surface comprising or even consisting of a thermoplastic biocompatible polymer.

One embodiment of a layer having a diffractive microstructure according to the present invention comprises a self-supporting layer or film wherein the diffractive microstructure has been impressed upon the film as such. Another embodiment comprises a layer applied to the surface of a fibrous web or sheet or similar planar substrate, said layer having been embossed to provide a diffractive microstructure.

In the embodiment of the self-supporting layer, the polymer film has preferably a thickness of about 0.1 to 100 micrometres, in particular about 0.5 to 50 micrometres. The film comprises for example a polymer selected from the group of poly(lactic acid), polylactide and polycaprolactone.

Naturally, it should be understood that the self-supporting film need not be continuous but can be deposited on supporting substrate such as another polymer film or a fibrous web or sheet.

In the embodiment where the layer is deposited on a substrate, the layer may have a similar thickness as explained above, preferably about 0.1 to 50 micrometres. Typically, this layer is formed from starch and starch derivatives or other carbohydrates and derivatives thereof which do not form a film (cf. below).

The biocompatible polymer of the present invention typically has a moderately high to high glass transition point, e.g. up to about 210° C., in particular 200° C. or less, preferably from about at least 30 or 60 up to 170° C.

For the purpose of the invention, the thermoplastic polymer is in particular selected from thermoplastic, biocompatible or biodegradable polymers derived from carbohydrate materials. This group of carbohydrate materials comprises native starch, dextrin, native hemicellulose, native cellulose as well as derivatives thereof, viz. starch derivatives, dextrin derivatives, hemicellulose derivatives, cellulose derivatives, and mixtures thereof. Other suitable materials include poly(lactic acid), polylactides, polycaprolactone and similar "biopolymers", i.e. polymers produced from biologically available monomers which are or can be considered to be derived from carbohydrate materials.

In order to convert the carbohydrate polymer into a thermoplastic polymer, the polymer material is plasticized. The plasticization can be effected by incorporating suitable substituents (internal plasticization) or by blending or melt-blending the native polymer with conventional ("external") plasticizers, typically monomeric plasticizers. It is also possible to combine these two approaches.

As a specific example of the latter alternative, the working embodiment can be mentioned wherein the carbohydrate polymer is plasticized with a hydroxyl compound selected from the group of $C_2$ to $C_4$ alcohols having 1-5 hydroxyl groups, in particular glycerol or sorbitol or mixtures thereof. Other plasticizers are water, acetic glycerol esters, propylene glycol, dipropylene glycol, citric acid alkyl esters and mixtures thereof.

Internally plasticized polymers, e.g. starch or cellulose derivatives, are generated from starch or cellulose by a chemical reaction, and at least part of the anhydroglucose units of the molecule comprises groups that modify the hydroxyl functions of said units.

It should be noted that for some applications it is particularly preferred to use chemical derivatives of biopolymers. Thus, e.g. esterification (for instance acetylation) improves the thermal stability of the product, when compared with native starches. This is advantageous especially when the product is used as a pigment at an elevated temperature.

The esters or ethers or mixed ester/ethers of starch are typically prepared from native starch, hydrolyzed starch, oxidized starch, cross-linked starch or gelatinized starch. The starch, in turn, can be based on any natural starch, the amylose content of which is 0-100% and the amylopectin content 100-0%. Accordingly, the starch can be sourced from barley, potato, wheat, oats, pea, corn, tapioca, sago, and rice, or similar tuber vegetables and cereal crops.

According to a preferred embodiment, the starch-based component is an ester formed of starch and one or several aliphatic $C_{2-24}$ carboxylic acids. The carboxylic acid residue of the ester can be derived from a lower alkane acid, such as acetic acid, propionic acid or butyric acid, or a mixture of them. According to a preferred embodiment, the starch component is an esterified starch, most suitably a starch acetate, the degree of substitution of which is 0.5-3, preferably 1.5-3 and most suitably 2-3. Suitable starch acetates are disclosed in, e.g. FI 113875, FI 107386 and WO 05/037864.

The starch ester can also be derived from natural saturated or unsaturated fatty acids. Examples of these are palmitinic acid, stearic acid, oleic acid, linolic acid, and mixtures of them. The ester may also comprise both long ($C_{16-24}$) and short chain ($C_{2-14}$) carboxylic acid components. An example of these is a mixed ester of acetate and stearate. Besides acids, corresponding acid anhydrides, and acid chlorides and other corresponding reactive acid derivatives, too, can be used to form esters in a way which is known per se.

The production of fatty acid esters of starch can be carried out as described for instance in the following documents: Wolff, L A., Olds, D. W. and Hubert, G. E., The acylation of Corn Starch, Amylose and Amylopectin, J. Amer. Chem. Soc. 73 (1952) 346-349 or Gros, A. T. and Feuge, R. O., Properties of Fatty Acid Esters of Amylose, J. Amer. Oil Chemists' Soc 39 (1962) 19-24.

Lower ester derivatives, such as starch acetate, can be prepared by bringing the starch to react with an acid anhydride which corresponds to the ester group, for instance acetic anhydride, in the presence of a catalyst. Starch acetate can be produced for instance with the methods according to FI Patent No. 107386 or U.S. Pat. No. 5,667,803, or with other methods which are commonly used in acetylation of starch.

Another important starch component of the invention is represented by an ether formed by starch and a hydroxy alkyl group, the hydroxy alkyl component of which is preferably derived from ethylene oxide or propylene oxide. The molecular substitution of such an etherized starch is ca 0.05-6, preferably 0.1-3, in particular 0.3-2.

Other suitable polymers include cellulose derivatives and hemicellulose derivatives, such as cellulose esters and xylan esters.

As mentioned above, the starch component can be plasticized by blending it with a known softener, i.e. plasticizing agent. Thus, the composition according to the invention includes according to a preferred application in particular 0.01-50 wt-%, preferably ca 1-30 wt-% of plasticizer. Any of the above-mentioned plasticizers can be employed.

According to a preferred embodiment, the thermoplastic carbohydrate polymer is a hydrophobic starch ester having a degree of substitution of at least 1.7, in particular at least 2.0. According to another preferred embodiment, the thermoplastic starch polymers are native starch, hydrolyzed starch and ether derivatives thereof or esters having a low DS or less than 0.5.

The polymers can be applied on the surface in the form of particles or dispersions. A method for producing porous particles from starch-based raw-materials (for example starch esters or starch ethers) is described in our previous patents and patent applications (FI 20035172, FI 20035173, FI 20050833 and FI 20040741 (FI 118179)). In that method, the particles are prepared using a two-stage method in which the starch-based material is first dissolved in an organic solvent or a mixture of an organic solvent and a non-solvent, for instance water, from which mixture the starch component is subsequently precipitated by diluting the solution with a non-solvent. Said method generates essentially round, porous particles. These are suitable for example as fillers and pigments for paper. The derivatives are thermoplastic; Tg is typically approximately 150-160° C. During calendering, the particle undergoes moulding, which makes the paper glossy.

According to one embodiment of the invention, the thermoplastic polymer is applied to the surface of the substrate in the form of particles of the above-indicated kind.

According to another embodiment of the invention, the thermoplastic polymer is applied to the surface of the substrate in the form of a dispersion. Dispersions of starch derivatives and other hydrophobic biopolymers can be produced for example as discussed in EP 950074. In such a method, generally a mixture is formed from the hydrophobic biopolymer, a plasticizer, dispersion auxiliaries and water, the mixture is heated up in order to obtain a paste-like composition, and then the paste-like composition is diluted in water.

A particularly interesting way of applying the material of the layer on a substrate is in the form of a coating colour, wherein the pigment is at least partially made up of starch pigments of the above kind. In that embodiment, the coating colour is mixed according to a basic recipe for offset or gravure printing, but at least a part of the conventional coating pigments are replaced with the instant pigments. Thus, preferably at least 20 (or at least even 25) wt-% of the dry matter of the coating colour is formed by the thermoplastic biopolymer of the present invention. The pigment of the coating colour preferably makes up at least 30%, in particular at least 50% up to 100% of the pigment of the coating composition. The other pigment(s) can be any conventional pigment, usually an inorganic, mineral pigments, such as calcium carbonate (GCC and/or PCC), kaolin, talc, wollastonite, calcium sulphate and barium sulphate.

The application of the thermoplastic polymer can be carried out in a manner known per se, e.g. by a conventional (blade) coater, a film press coater, a curtain coater or with a size press. In case of dispersions, the transferral of a continuous film onto the surface of the web typically requires that the dispersion contains at least some external plasticizer.

After the application of the thermoplastic polymer on the substrate, water is evaporated from the layer of the coating colour. The layer is dried and hardened to the extent that it is possible by heat-treatment (over at least 50° C.) and increased pressure to achieve permanent diffraction patterns.

It should be pointed out that it is not necessary to provide the substrate with an integral layer which covers the whole substrate. For the purpose of the invention it is sufficient that the layer is present at the point where the embossing is carried out. Thus the thermoplastic carbohydrate polymer need only cover the part of the substrate where the barcode tag or safety marking or identification label is applied.

The substrate fibrous material is selected from cellulosic, lignocellulosic and thermoplastic fibres and mixtures thereof. Typically, the substrate comprises a web or sheet of paper or cardboard or a layer formed by natural fibres, such as cotton. It may comprise a base paper or cardboard, which optionally contains filler(s). The grammage can vary freely but is usually in the range of about 30 to 750 $g/m^2$, for example about 40 to 500 $g/m^2$, and the thickness is about 1 to 100 micrometres.

Summarizing, a method of producing a microstructure of the above kind, comprises
 forming a layer of a thermoplastic carbohydrate polymer having a glass transition point of less than 210° C., in particular less than about 170° C.; and
 embossing into the layer a diffractive microstructure comprising micro-protrusions or microgrooves or a combination thereof.

The layer is preferably embossed at a temperature of at least 100° C. and a pressure of 1.5 bar (abs.) or more.

The layer is formed on a substrate by depositing it from an aqueous slurry, and the layer deposited on the substrate is allowed to dry before embossing.

According to one embodiment, the layer is smoothened to a roughness of 5 ppm at most, preferably 3 ppm or less before embossing. The smoothening can be achieved with conventional calendaring, which can be carried out either on-machine or off-machine or by a combination thereof. Examples of suitable calenders include soft calenders, calenders with expended nips, thermocalenders and supercalenders to mention a few.

According to another embodiment, there is no need for smoothening of the surface before embossing. It has been found that for certain coating composition which are rich (over 50% by weight with respect to) in starch pigment, the surface smoothness does not appear to have any significant influence on the hot-embossing.

In practice, embossing can be carried out as known in the art. We refer to the art mentioned above in the general part of the description. Thus, the layer can be embossed using an embossing device comprising an embossing device and a backing member and further comprising means for adjusting the temperature of the embossing device.

The embossing device can be static or dynamic, as will be discussed below in connection with the examples. In case of dynamic embossing, the embossing member is placed on a roll. Typical, roll-on-roll embossing requires that there is an embossing device comprising in combination an embossing roll and a backing roll for exerting embossing pressure on the surface layer of a substrate which is pressed between the rolls.

Flat-bed embossing is done using embossing means, which comprise at least one embossing plate. The working surface of the plate can be, for example, of metal having a microfabricated negative of the desired embossing.

Generally, in both static and dynamic embossing, the embossing member used for achieving the desired pattern has a structure corresponding to the diffractive microstructure which is to be produced. It can be made on a thin metal sheet, in particular a thin nickel sheet, by, for instance, optical exposure combined with electrochemical deposition or by electron lithography. An embossing member also known as a shim is thus obtained and by using this shim, the desired diffractive microstructures is produced by pressing the shim onto the surface of the thermoplastic layer.

To achieve the shaping action, the surface needs to be soft, which can be obtained by increasing the temperature of the layer to about or above the glass transition point of the polymer.

The embossed products, sheets and webs, produced according to the present invention can be employed, for example, in the packaging industry to give the product a safety-marking for warranting the authenticity of the product or for graphically enriching the exterior decorative image of the packages. Examples of typically applications are daily consumer goods, cigarettes, digital media, pharmaceuticals, cosmetics, and consumer electronics, including fast moving consumer goods (FMCG) and food products.

It is highly advantageous for the package converter, product packager or brand owner that the microstructure can be applied to the surface during the processing, e.g. during last or penultimate step of the converting process, before or even during cutting, since this will do away with the need for further separate marking steps.

The following non-limiting working examples illustrate the invention.

EXAMPLE 1

Coating of Base Paper with Coating Colour Containing Modified Starch Pigments

LWC—base paper was coated with a one side laboratory coater (CLC-600) with following coating colour formulations presented in table 1. The coating pigments used in the formulations were clay, ground calcium carbonate and experimental modified starch based pigment developed at VTT.

Procedure

Coated paper samples containing 100, 50 or 0 parts of modified starch pigments in the conting (Example 1) were embossed using a static embosser. During these embossing tests only the hot-embossing temperature was varied from 70 to 145° C. The hot-embossing pressure and stamping time were kept constant; stamping time was 5 seconds and pressure 6 bars. The suitable temperature for good embossing quality is shown in Table 2.

TABLE 2

Suitable temperatures for paper samples coated with coating colors containing modifified starch based pigments and hot embossed using static embosser.

| Sample | Stamping time, s | Temperature, ° C. | Pressure, bar |
|---|---|---|---|
| 13b | 5 | 90-105 | 6 |
| 14 | 5 | 90-120 | 6 |
| 15 | 5 | 90-100 | 6 |
| 16 | 5 | 90-140 | 6 |
| 17 | 5 | 90-100 | 6 |
| ctg#16 | 5 | 90-145 | 6 |
| 18 | 5 | 90-120 | 6 |

The hot-embossing temperature scale for all samples, are relatively large. Based on the above date, a person skilled in the art can easily adapt the static process to continuous embossing using, e.g., a roll-to-roll embossing machine:

According to the tests the best sample based on visual estimation was calandered sample 16. The best results were obtained when the temperature of 130° C. and pressure of 5 bars for 5 s of embossing was used.

The results with noncalendared sample (ctg #16) were also surprisingly good, almost at the same level as for the calendered sample. It was noticed that the brightness of the noncalendared sample became better when higher embossing temperature was used.

TABLE 1

Coating color formulations for coating trials

| Coating Color | CLC13 | CLC13B | CLC14 | CLC14B | CLC15 | CLC16 | CLC17 | CLC18 |
|---|---|---|---|---|---|---|---|---|
| Clay | 50 | 50 | 0 | 0 | 25 | 0 | 100 | 0 |
| GCC | 0 | 0 | 50 | 50 | 25 | 0 | 0 | 100 |
| AP (New pigment) | 50 | 50 | 50 | 50 | 50 | 100 | 0 | 0 |
| Latex | 12 | 12 | 12 | 12 | 12 | 12 | 12 | 12 |
| CMC | 1.5 | 1.5 | 1.5 | 1.5 | 1.5 | 1.5 | 1.5 | 1.5 |
| Viscosity, cP | 4230 | 1480 | 5700 | 1920 | 5560 | 3000 | 1440 | 5110 |
| Density, g/l | 1104 | | 1166 | | 1170 | 976 | 1430 | 1512 |
| ÅA-GWR, g/m² | | 0.09313 | | 0.1715 | 0.09838 | 0.17975 | 0.0545 | 0.09938 |
| PH | 7.6 | 7.6 | 8.2 | 8.2 | 8.2 | 6.8 | 7.6 | 8.4 |
| Solids, % | 50 | 45 | 50 | 45 | 50 | 40 | 60 | 65 |

The samples were calandered three passes at 500 kN/m² with a laboratory calander, tested for paper technical and surface properties and printed with a four-color offset press. The uncalandered sample of coating color 16 was not printed and it is marked with ctg #16.

Selected calandered and printed samples and uncalandered sample ctg #16 were hot-embossed.

EXAMPLE 2

The aim of this task was to the test embossability of the paper samples, which were coated with coatings containing different amounts of starch based pigment. The amount of coating was about 7 g/m2 for each sample. Sample ctg #16 was uncalandered.

The suitable hot-embossing temperature range with sample 13b, and 15 were narrower than for the other samples. This was maybe caused by the lower content of the starch pigment amount in the coating and combination of effects of starch based and mineral pigments.

The weakest embossing effects could be seen on samples 17 and 18 which were coated with coating colors containing only mineral pigments.

The invention claimed is:

1. A diffractive microstructure consisting of micro-protrusions or microgrooves or a combination thereof formed in a layer,
    wherein said layer consists of a thermoplastic carbohydrate polymer, said polymer having a glass transition point of less than 210° C., wherein the thermoplastic carbohydrate polymer is a hydrophobic starch ester having a degree of substitution of at least 1.7, and wherein the thermoplastic carbohydrate polymer is plasticized with a hydroxyl compound selected from the group of C2 to C4 alcohols having 1-5 hydroxyl groups, sorbitol and mixtures thereof, wherein said layer is a self-supporting layer or film having a thickness of from 0.1 to less than 12 micrometers.

2. The microstructure according to claim 1, wherein the micro-protrusions or microgrooves or the combination thereof form a detectable pattern.

3. The microstructure according to claim 1, which is capable of diffracting monochromatic or polychromatic light.

4. The microstructure according to claim 3, which is capable of diffracting light in the visual range, in the ultraviolet range, in the infrared range or in a broad wave length range comprising visual, ultraviolet and/or infrared light.

5. The microstructure according to claim 1, comprising a barcode tag or a safety marking or an identification label or a combination thereof.

6. The microstructure according to claim 1, comprising a cinegram, an exelgram or a hologram.

7. The microstructure of claim 1, wherein the thermoplastic carbohydrate polymer is a hydrophobic starch ester having a degree of substitution of at least 2.0.

8. The microstructure of claim 1, wherein the thermoplastic carbohydrate polymer is plasticized with a glycerol or sorbitol or mixtures thereof.

* * * * *